NONLINEAR FUNCTION GENERATOR

Filed July 11, 1966

INVENTORS,
GABRIEL J. LUHOWY
RICHARD H. MOEHLMANN.
BY: Harry M. Saragovitz,
Edward J. Kelly,
Herbert Berl &
Julian C. Keppler
ATTORNEYS.

United States Patent Office 3,465,168

Patented Sept. 2, 1969

3,465,168
NONLINEAR FUNCTION GENERATOR

Gabriel J. Luhowy, Lima, and Richard H. Moehlmann, Rochester, N.Y., assignors, by mesne assignments, to the United States of America as represented by the Secretary of the Army Filed July 11, 1966, Ser. No. 564,436
Int. Cl. G06g 7/12
U.S. Cl. 307—230 3 Claims

ABSTRACT OF THE DISCLOSURE

The generator comprises a negative feedback amplifier including signal and feedback inputs and an output. A high resistance is connected between the output and feedback input to form a feedback path. A nonlinear network shunts the feedback path and the feedback factor of the amplifier is made large. With this arrangement the transfer characteristic of the circuit will be substantially the same shape as the voltage vs. current characteristic of the nonlinear network.

Figure 1:
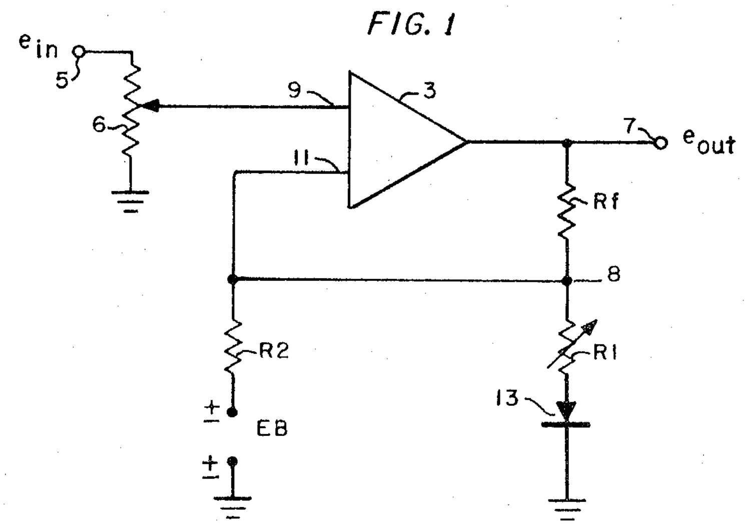

The present invention relates to a novel and useful function generator. A function generator is a device which when fed an input signal yields an output which is an arbitrary function of the input. The arbitrary function is usually nonlinear, for instance, the output may be a sinusoidal, logarithmic, or exponential function of the input. Function generators find use in analog computers and in other types of electronic circuits. In the past, mechanical linkages, specially wound potentiometers, cathode ray tubes and arrays of biased diodes have been used to generate these nonlinear functions. In the prior art biased diode type generator, a plurality of interconnected diodes are biased at different voltages and the input voltage, as it assumes different values, will overcome these different biases at different values of input voltage, thus changing the impedance between the input and output terminals in step fashion. The transfer characteristic of such a circuit will therefore be a polygonal function comprising a series of connected linear segments which can be adjusted to approximate any nonlinear function if the number of segments is made large enough. Such a function generator requires a large number of diodes and bias sources and is difficult to adjust. Further, variation of the diode characteristics with temperature has been a source of inaccuracy and drift of these prior art diode type function generators. The present invention comprises a simplified function generator which has a nonlinear transfer characteristic which closely approximates the nonlinear voltage vs. current characteristic of a network, which may comprise only a crystal or semiconductor diode, which shunts the feedback path of a high gain amplifier with negative feedback. The feedback voltage is made to vary with the output voltage in the same nonlinear fashion as the $v$ vs. $i$ characteristic of the nonlinear network. Since the output of a high gain amplifier with negative feedback is determined mainly by the feedback voltage, the amplifier output will closely follow the nonlinear feedback voltage characterisic which in turn depends on the $v$ vs. $i$ characteristic of the nonlinear circuit element or network. By varying the bias on the nonlinear element the operating point thereof can be shifted to regions of different curvature of the $v$ vs. $i$ characteristic and the transfer characteristic of the function generator will be correspondingly changed. Further, by utilizing as the nonlinear element a type of diode with stable temperature characteristics, the problem of temperature drift or instability is eliminated.

It is therefore an object of the present invention to provide a simplified and versatile function generator.

Another object of the invention is to provide a nonlinear function generator in which a nonlinear circuit element or network in the feedback circuit of an amplifier controls the transfer characteristic thereof.

A further object of the invention is to provide a function generator with stable temperature characteristics.

Figure 2:
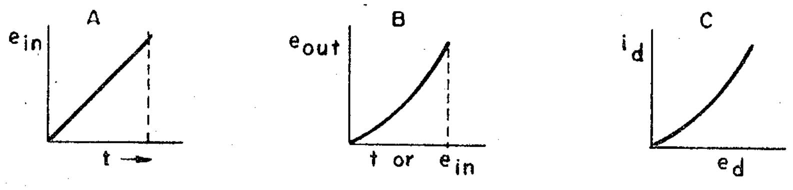

These and other objects and advantages of the invention will become apparent from the following detailed description and drawings, in which:

FIG. 1 is a circuit diagram of an illustrative embodiment of the present invention, and FIG. 2 is a series of waveforms illustrating the operation of FIG. 1.

In FIG. 1 the high gain amplifier 3 has signal input 9 connected to the slider of potentiometer 6. Input voltage $e_{in}$ is connected to terminal 5. Serially connected from the output terminal 7 of amplifier 3 to ground is the resistor R$f$, variable resistor R1 and a nonlinear circuit element comprising backward diode 13. The voltage at point 8, the junction of R$f$ and R1 is applied to the feedback input 11 of the amplifier. Since the feedback is negative the net input of the amplifier is the difference between the voltages at the signal and feedback inputs, 9 and 11. A DC bias supply EB is connected to the junction of resistors R$f$ and R1 via resistor R2 to provide a bias supply for the diode 13. The polarity of EB may be such as to provide either a forward or reverse bias for diode 13, as indicated by the dual polarity symbols at the bias terminal. In accordance with one feature of the invention, the resistor R$f$ is made much larger than the sum of the resistances of the diode 13 and resistor R1, and thus the nonlinear network comprising the diode and R1 will be driven from an essentially constant current source. This constant current will be proportional to the function generator output voltage ($e_{out}$) at terminal 7. Since the current flowing through R$f$, R1 and diode 13 is constant at any given output voltage, $e_{out}$, and is determined by the large-value resistor R$f$, the voltage drop across diode 13 and resistor R1 will substantially follow the nonlinear voltage vs. current characteristics of these two series connected elements as the output voltage varies. For example, if the diode 13 is forward biased by EB, it and the resistor R1 may have a composite voltage vs. current characteristic such as shown in FIG. 2$c$. A curve of this shape indicates that the current varies as a power greater than unity of the voltage and also indicates that the nonlinear resistance is highest at zero current and voltage and decreases as both current and voltage increase. The diode current $i_d$ will be directly proportional to the output voltage, $e_{out}$, and hence the feedback voltage at point 8 will vary with $e_{out}$ in the same nonlinear way that $i_d$ varies with $e_d$. Thus, in the illustrated example, at low output voltage the high resistance of the nonlinear network results in a relatively high percentage of the output being negatively fed back. Since high negative feedback results in low overall gain, the output for small values of input will be relatively depressed. As the input and output rise to higher values or levels the percentage of the output fed back decreases due to the smaller resistance of the nonlinear network at higher currents and the overall gain increases resulting in upward curvature of the transfer characterisic, as shown in FIG. 2$b$. Thus the transfer characteristic is seen to have the same shape as the $v$ vs. $i$ characteristic of FIG. 2$c$. FIG. 2$a$ shows the function generator input as a ramp or sawtooth type signal. With the nonlinear network with the characteristic of FIG. 2$c$ shunting the feedback path, the linear sawtooth input would be converted to a nonlinear sawtooth of similar shape to FIG. 2$c$, as shown in FIG. 2$b$. The curve of FIG. 2$b$ is also the transfer characteristic or the relationship of the output to input voltages.

In order that the nonlinear network shunting the feedback path sees the amplifier output as a constant current source, the resistor $Rf$ should be made at least twenty-five times the average resistance of the nonlinear network. Further, in order for the transfer characteristic of the function generator to closely approximate the nonlinear characteristic of the feedback voltage, the amplifier feedback factor (A$\beta$) must be substantially larger than unity. This follows from the theory of feedback amplifiers. The overall gain A′ of a feedback amplifier is given by the following relation:

$$A'=\frac{e_{out}}{e_{in}}=\frac{A}{1-A\beta}$$

wherein A is the amplifier gain in the absence of feedback and $\beta$ is the ratio of the feedback voltage to the total output voltage. It can be seen that if the feedback factor (A$\beta$) in the above equation is much larger than unity, for example, if it is ten or more, the overall gain A′ reduces to $-1/\beta$ which is independent of A. In the case of the present function generator, the overall gain varies depending on the instantaneous resistance of the nonlinear network in the feedback path, which determines $\beta$.

The nonlinear network may comprise only the diode 13 or may be a complex network comprising many linear and nonlinear circuit elements, the composite characteristic of which is that required for a particular function generator application. The use of variable resistor R1 in series with the diode 13 permits the $v$ vs. $i$ characteristic of the composite nonlinear network comprising both R1 and diode 13 to be varied by adjustment of R1. This permits minor variations in the characteristics from diode to diode to be compensated for and makes it unnecessary to select diodes. Further, by adjusting the voltage and/or polarity of the bias source EB the nonlinear network can be biased to regions of different curvature, thus producing a correspondingly different transfer characterisic for the function generator. The backward diode 13 has been utilized as the nonlinear element because of its good temperature stability compared to other crystal diodes. A backward diode, sometimes called a uni-tunnel diode, is similar to a tunnel diode but has a suppressed negative resistance characteristic. The potentiometer 6 permits the input signal $e_{in}$ to be attenuated before application to the signal input 9. This changes the amplitude of the output voltage and thus changes the range of the characteristic of the nonlinear network over which the output sweeps and therefore provides a second adjustment of the transfer characteristic of the function generator. The purpose of resistor R2 is to prevent the feedback line from being clamped to the bias voltage EB.

While the invention has been described in connection with an illustrative embodiment, the inventive concepts disclosed herein are of general application and hence the invention should be limited only by the scope of the appended claims.

What is claimed is.

1. A function generator comprising; a negative feedback amplifier comprising a signal input, a feedback input and an output, a resistor connecting said output to said feedback input to form a feedback path, a nonlinear network shunting said feedback path, said resistor being of such value that the current from said output flowing through said resistor and said nonlinear network is substantially independent of the resistance of said nonlinear network, and the feedback factor of said amplifier is substantially larger than unity, whereby the transfer characteristic of said function generator will be substantially the same shape as the voltage vs. current characteristic of said nonlinear network, and wherein said network comprises a backward diode and wherein a bias source is connected to said diode.

2. A function generator comprising; a negative feedback amplifier comprising a signal input, a feedback input and an output, a resistor connecting said output to said feedback input to form a feedback path, a nonlinear network shunting said feedback path, said resistor being of such value that the current from said output flowing through said resistor and said nonlinear network is substantially independent of the resistance of said nonlinear network, and the feedback factor of said amplifier is substantially larger than unity, whereby the transfer characteristic of said function generator will be substantially the same shape as the voltage vs. current characteristic of said nonlinear network, and wherein said nonlinear network comprises a serially connected backward diode and an adjustable resistor.

3. The function generator of claim 1 wherein said feedback factor of said amplifier is at least ten.

References Cited

UNITED STATES PATENTS

| | | | |
|---|---|---|---|
| 3,121,200 | 2/1964 | Samson | 307—229 |
| 3,166,720 | 1/1965 | Rosen | 307—229 |
| 3,321,642 | 5/1967 | Peterson | 307—323 |
| 3,327,131 | 6/1967 | Grimmer | 307—323 |
| 3,374,361 | 3/1968 | Callis | 307—229 |
| 3,399,312 | 8/1968 | Gray | 307—229 |

OTHER REFERENCES

Electronic Analog Computer by Korn & Korn 1952 pages 10–12.

JOHN S. HEYMAN, Primary Examiner

H. A. DIXON, Assistant Examiner

U.S. Cl. X.R.

307—323